United States Patent [19]

Cagliostro

[11] Patent Number: 5,500,517
[45] Date of Patent: Mar. 19, 1996

[54] APPARATUS AND METHOD FOR DATA TRANSFER BETWEEN STAND ALONE INTEGRATED CIRCUIT SMART CARD TERMINAL AND REMOTE COMPUTER OF SYSTEM OPERATOR

[75] Inventor: Charles W. Cagliostro, Hopewell Junction, N.Y.

[73] Assignee: Gemplus Card International, Gemenos, France

[21] Appl. No.: 300,049

[22] Filed: Sep. 2, 1994

[51] Int. Cl.⁶ .................................................. G06K 7/00
[52] U.S. Cl. .................................................. 235/486
[58] Field of Search .................................. 235/487, 492, 235/494, 486, 380, 375

[56] References Cited

U.S. PATENT DOCUMENTS 5,047,614  9/1991  Bianco ............................... 235/382 X

FOREIGN PATENT DOCUMENTS

| 0028892 | 2/1987 | Japan | 235/486 |
| 0014192 | 1/1991 | Japan | 235/486 |
| 4205079 | 7/1992 | Japan | 235/486 |
| 5233887 | 9/1993 | Japan | 235/486 |

*Primary Examiner*—Donald T. Hajec
*Assistant Examiner*—Thien M. Le
*Attorney, Agent, or Firm*—Roland Plottel

[57] ABSTRACT

A hand held, unitary assembly, data collection device for an off-line vending machine such as a parking meter, which is operable by smart integrated circuit chip cards. The vending machine has a chip card reader, and which stores data as to the sale of goods/services from the machine. The device has a first portion which mechanically and electrically fits the vending machine reader; and a second portion with an opening to receive a PCMCIA card. Data is retrieved and transferred to the PCMCIA card. The first and second portions are rigidly joined to one another forming a unitary assembly, and the second portion securely holds the PCMCIA card, and is also a handle for gripping the device.

19 Claims, 2 Drawing Sheets

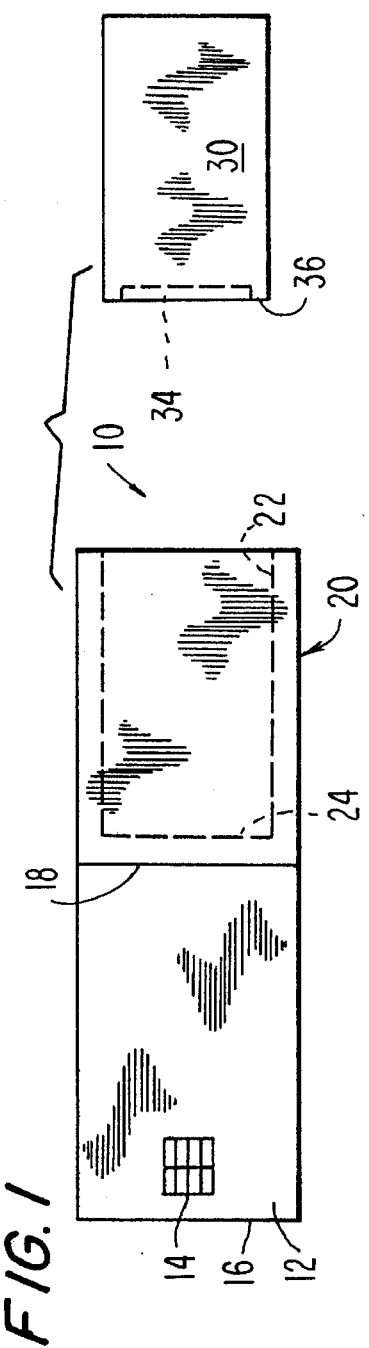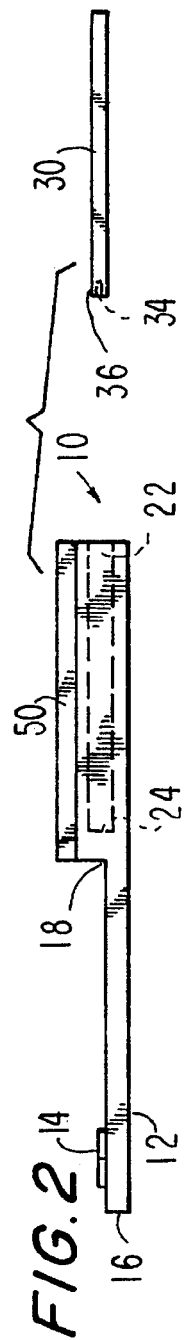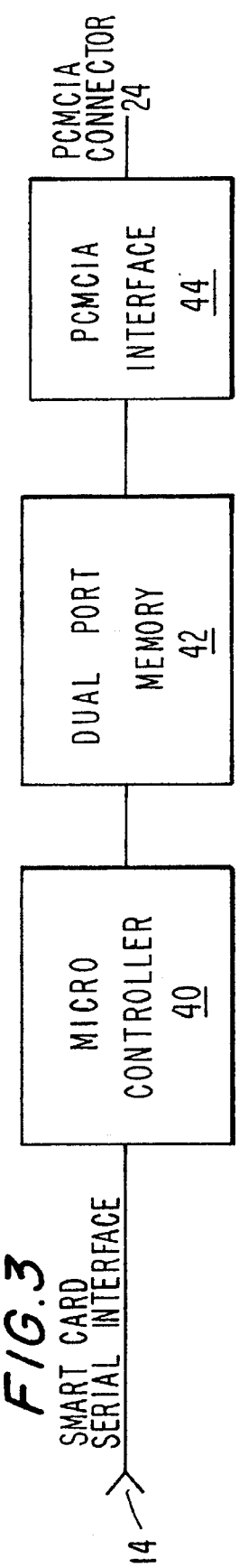

APPARATUS AND METHOD FOR DATA TRANSFER BETWEEN STAND ALONE INTEGRATED CIRCUIT SMART CARD TERMINAL AND REMOTE COMPUTER OF SYSTEM OPERATOR

BACKGROUND OF THE INVENTION

This invention relates generally to the transfer of data between integrated circuit smart card read/write terminals and a remote central computer, and more particularly to such smart card terminals which are stand alone terminals, i.e. which are not connected to the remote central computer during each transaction.

Integrated circuit cards, or smart cards, have a significant advantage over other types of cards, e.g. magnetic stripe cards, in their inherent security. It is very difficult for a thief or a person wishing to use the card fraudulently or, to successfully tamper with the card. This inherent security permits the smart cards to be used in transactions which take place at terminals which do not check or verify each transaction with a central computer or central authority. Thus, some transactions with smart cards, may be done at terminals which are "off line".

With an off line transaction, the exchange between the smart card and the smart card reader/writer generates transaction data which is stored in the memory of the smart card reader/writer. This transaction data for example may be a cryptographic signature generated by the smart card, a token left by the smart card, the card holder's name, or simply the smart card serial number. In a banking application, the token's cryptographic signatures, or IDs of the card are used to reconcile the accounts. This transaction data must be collected by the system operator periodically to perform account settlement, inventory management, fraud detection, and other functions. Additionally, an operator may want to down load new software applications to these smart card readers/writers or add "black" lists of stolen/bad smart cards.

Presently, many point of sale terminals which have a modem can up load these transactions, or down load applications at the end of the day in an on line batch mode. For other remote devices, such as vending machines or parking meters, where a phone line is impractical, an off line data transfer device is used.

DISCUSSION OF THE PRIOR ART

There are several types of off line data transfer devices which vary by memory, size and functionality. The simplest of these is simply a smart card. In many applications, this device is sufficient. Quite often, the memory size of the smart card is not big enough. Another type of device is a dedicated device with a smart card interface, nonvolatile memory storage area, a microcontroller, a battery backed-up real time clock. This type of device is typically a ruggardized device with a much larger memory capacity than a smart card and works well in many applications.

A draw back of this type of device is that to change the memory size or certain other features of the unit typically requires redesign of the device. Additionally to communicate with the device at the operator's main site requires often a long time because this smart card has an interface which is serial, and the serial interface limits data throughput.

Another type of device is a computer, e.g. hand held or laptop, within a device, driven from the serial port, which can communicate with the smart card reader/writer. This type of device has a much greater memory capacity and is capable of communicating via a floppy disk parallel port, but is usually not used since its cost is high, its functionality makes it attractive to thieves, and it is not well suited to the harsh environment of a delivery truck. The computer or laptop may have a PCMCIA for mass memory storage or a data communication device and the laptop serves only as a communications facilitator between the smart card reader and the PCMCIA card.

SUMMARY OF THE INVENTION

In other to avoid the shortcomings of the prior art, there is provided in one aspect of the invention a communicator collection device to be connected between an off-line smart cart reader/writer terminal and a PCMCIA card. The device has a first portion with predetermined mechanical dimensions to fit into the smart card reader/writer terminal slot, and electric contacts mate with electric contacts in the slot; a second portion extends outside the reader/writer slot when the first portion is in the slot and which mates mechanically and electrically with the PCMCIA card. A microcontroller provides signals to the first part's electric contacts to transfer data between read/write terminal and the PCMCIA card when the device is connected to both said read/write terminal and the PCMCIA card.

According to another aspect of the invention, there is provided a method of transferring data between an off-line smart card reader/writer terminal and a remotely located central computer including the steps of: establishing communication with the reader/writer terminal by inserting a smart card therein, transferring programs/data between the reader/writer terminal and a wireless modem PCMCIA card connected to the smart card, and transferring programs/data between the PCMCIA card and the remote central computer, while the PCMCIA card is connected to the terminal.

BRIEF DESCRIPTION OF THE DRAWINGS.

FIG. 1 is a top schematic view of a device according to one aspect of the invention.

FIG. 2 is a side schematic view of FIG. 1.

FIG. 3 is a block diagram of an embodiment of the invention.

DETAILED DESCRIPTION OF THE PREFERRED EMBODIMENTS

Figure 4:
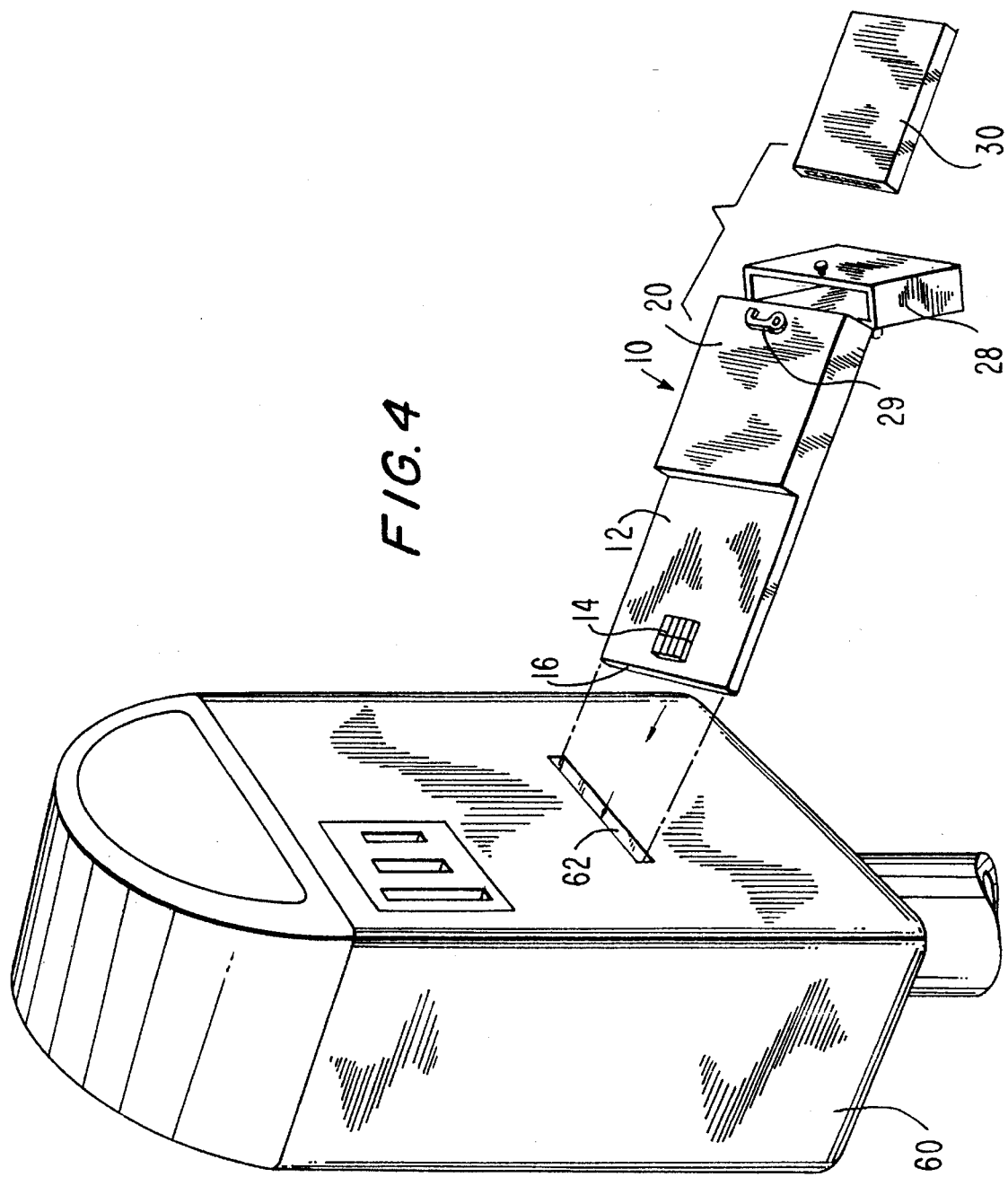
FIG. 4 is a perspective view of an alternative device.

FIGS. 1 and 2, are top and side schematic views, respectively, of a device 10 of one embodiment of the invention. It has a smart card portion 12 with smart card contacts (shown schematically) 14. The integrated circuit cards or smart cards of this type have physical characteristics and dimensions and locations of the contacts which are adopted to and follow the International Standards Organizations, and ANSI (American National Standard Institute) standard ISO/DIS 7816-2.2, distributed in the United States by the American National Standards Institute, 11 West 42nd Street, New York, N.Y. 10036. The full dimension of such cards is approximately 8.5 centimeters by 5.5 centimeters by 1.0 millimeter and have a contact area of approximately 2 millimeters by 1.7 millimeters. The contact area contains eight contacts, arranged two by four, each approximately 2 millimeters by 1.7 millimeter and separated one-from-another by approximately 0.84 millimeter. Further details of the exact location of the contacts and their positions on the card is set forth in the ISO standard 7816, entitled "Identification Cards—Integrated circuit cards with contact—Parts 1 and 2" available from ANSI. Several hundreds of millions of such cards are produced each year and used throughout the world. One of the manufacturers of the card is the assignee of applicant's invention, GEMPLUS CARD INTERNATIONAL, Avenue du Pic de Bertagne—Parc d'activités de la Plaine de Jouques, 13420 GEMENOS, France.

When a card is inserted into a card reader of a reader/writer terminal, the card is either completely inside, or approximately 1.5 centimeter of the card extends outward from the reader slot.

In FIGS. 1 and 2, the smart card portion 12 fits into a card slot of a smart card reader/writer terminal, and make electrical contact with the connections in said card slot.

The reader/writer terminal for use with the present invention can be a stand alone terminal, i.e. one that is not in communication with a remote computer. Examples are parking meters, vending machines. A user of the terminal would have a prepaid smart card with tokens or value, or credit. The prepaid card is entered into the off line terminal and "buys" time on the parking meter or, a pack of cigarettes, or whatever other item is dispensed by the vending machine. The smart card might have prepaid money value which would then be subtracted from the card, or might be of a credit card type, which would record that the value of the parking time or the item being sold is to be charged to the card owner's account. It is expected that this type of stand alone read/write terminal would probably operate mostly with prepaid cards, but it is not limited for use with prepaid cards.

The transaction would be recorded in the read/write terminal, but because the terminal is not connected to the operator's computer, the data must be transferred on a periodic basis to the computer to record the use of the machine, inventory control, and if a charge is to be made to the card owner's account. Additionally, from time to time, data or programs may be entered into the read/write terminal, e.g. change in the cost of using the parking meter or change in price of the goods being sold from the vending machine, or to include lists of cards, which have been stolen or should not be accepted.

One end 16 of the card portion 12 is inserted into the card slot of the read/write terminal and the card 12 would slide into the slot. Extending from the opposite end 18 of the card portion 12 is a housing 20 having a slot therein 22 with electrical contacts 24 at one end 26 to receive a PCMCIA card 30 shown schematically with an arrow pointing to be inserted into the slot 22.

Contacts 34 on the PCMCIA card 30 are made with the contacts 24 on the housing 20. The slot 22 inside the housing is provided with the mechanical size and slots to accept and securely hold the card 30 in the housing 20.

The standards for PCMCIA cards both electrical and mechanical are defined by the Personal Computer Memory Card International Association, 1030 East Duane Avenue, Sunneyvale, Calif. 94086. PCMCIA standard release 1.0–2.1 lists three types of PCMCIA cards type I, type II, and type III. All of the cards use the same electrical interface, although type I card is 3.3 mm thick, type II card is 5.0 mm thick, and type III card is 10.5 mm thick. At the present time, it is the type II and the type III cards are used for I/O features, although the invention is not limited to any particular type of PCMCIA card. Approximately 215 companies supply the various PCMCIA cards and accessories including memory cards, modem cards, wireless modem cards. Lists of these companies are in the publications from the Association.

FIG. 3 is a block diagram showing electrical connections between the contacts 14 on the smart card portion 12 and the contacts 24 on the PCMCIA slot 20.

The smart card contacts 14 are eight in number, which include ground, power, input/out serial, clock from the read/write terminal and reset. The remaining three terminals are presently not used in the current standards. Data flows serially through the input/out contact. In operation, the reset terminal is normally high. When it goes low, a signal goes from the card to the read/write terminal which initiates operation. In FIG. 3, the smart card contacts are shown schematically as 14 and are connected to a microcontroller 40, which is connected to a dual port memory 42, which outputs to a PCMCIA interface 44 and then outputs to the PCMCIA connector electric contacts 24. The contacts 24 make contact with the contacts 32 and PCMCIA card 30.

The microcontroller 40 is any convenient or conventional microcontroller such as the model 8051 manufactured by SGS-Thomson Microelectronics or the 6805 family manufactured by Motorola. The microcontroller typically would cause an interrogation of the read/write terminal, initiated by a signal on the reset contact, e.g. with an answer to "reset I" to get data. This would permit interrogation of the read/write terminal and the passage of data serially on the smart card serial interface 14. Serial data flows into the microcontroller 40 where it is converted to parallel, e.g. 8-bit word, and passed to a dual ported memory 42. The dual ported memory passes the data received in parallel between its input from the microcontroller 40 to an output connected to the PCMCIA interface 44. The interface configures the data received, from 8 bits to the standard 68-pins to the contact on the PCMCIA connector 24. The microcontroller, dual-ported memory, and the control for interrogating a read/write terminal may by of any convenient or conventional type. One such system for going from serial to parallel is in equipment sold by applicant's assignee, Gemplus Card International.

Electrical power for operating the device 10 may come from either the device itself, as shown schematically from a power supply 50 mounted in the housing. Power would typically be in the device when the stand alone read/write terminal is one having little power, such as a parking meter which is supplied with a solar cell or a vending machine in a location that also has a trickle power source. If the read/write terminal has a conventional power supply, then the power for operating the device 10 could come from the read/write terminal. There are three additional contacts in the contact area 14, which can be used for power.

The device may also be used for downloading information. Here, the PCMCIA card would supply programs or data to be entered into the read/write terminal. Upon inserting the smart card portion 12 into the slot of the read/write terminal a signal would be on the set contact to which the answer would be, e.g. reset II, i.e. to download data. The read/write terminal would then acknowledge receipt of this signal and there would be a downloading into the appropriate portion of the read/write memory terminal.

The PCMCIA card 30 may be a memory card, or a communications card such as a modem or a wireless modem card. If a wireless modem card is used, there would be a particular advantageous feature in the invention. When the card is inserted into the read/write terminal, a wireless, e.g. cellular telephone connection may be established with the host computer. The computer can then communicate directly with the read/write terminal. The time, at which read/write terminal is being interrogated would be provided in real time to the host computer, which could then keep track of the progress of the data collection from the different terminals. Also, uploading of new programs and other features into the terminals could be achieved. Alternatively, the modem could be connected through a conventional telephone line and could then be plugged in. If a memory terminal is used, the data would be batch collected and then transferred by removing and connecting the PCMCIA card directly or through a modem to the host computer.

With the device 10, a range of off the shelf PCMCIA cards could interface to a smart card reader/writer for data transfer. If the data transfer need not be too secure, a standard PCMCIA card could be plugged into this device. Then, as the delivery person returns to the operator's central site, he could turn in the PCMCIA card which could easily be read by the operator's main computer. If the data transfer required a secure format, a secure PCMCIA memory card with an onboard smart card could be used to store the data securely in its memory. Such a security PCMCIA card is the subject of applicant's assignee's copending U.S. patent application No. 07/997,501 filed on Dec. 28, 1992. If immediate data transfer is required, a PCMCIA data modem can be inserted which communicates directly with the operator's main computer via, e.g. the cellular phone network. This type of data transfer method has two main advantages. One, it allows the operator to track the progress of the operator as work is completed during the day. Two, it solves the authentication problem between the off line data transfer device and the smart card reader/writer, since now the authentication is occurring between the operator's central computer and the smart card reader/writer. Alternatively, a terminal, e.g. an off line point-of-sale terminal could be connected to the central computer by using the device shown with a PCMCIA modem card via a telephone line.

FIG. 4 is a schematic perspective view showing the device 10 to be inserted into a slot 62 of a stand alone read/write terminal which in this Figure is a parking meter 60. The smart card portion 12 with the smart card contacts 14 is to have its end 16 introduced into the slot 62 and the card portion will fit into the slot 62 and make contact with contacts (not shown) in the slot 62. The PCMCIA card 30 is to be inserted into the slot in the housing 20 as shown in FIG. 4. At the far end of the housing 20 is a hinged door 28. Once the PCMCIA card 30 is inserted into the slot 22 the door 28 is shut and a hook or latch 29 or other fastener holds the door closed, keeping the PCMCIA card securely in the slot. The door 28 may be provided with an opening or window (not shown) for the passage of a telephone line where the card is a wired modem, or for an antenna if a wireless moden. As shown in FIG. 4 the device is a unitary assembly and is of the size and shape for the housing 20 to fit easily into the hand of an operator. The device preferably is not only compact, self-contained, but ruggardized. The latch 29 may be a secure latch such as a mechanical lock to prevent accidental or mischievous opening and tampering with the PCMCIA card.

Various modifications of the invention can be made without departing from the scope or spirit of the invention.

What is claimed is:

1. A data collection device for an off-line vending machine which is operable by smart integrated circuit chip cards, which has a chip card reader, and which stores data as to the sale of goods/services from the machine, said data collection device comprising (a) a first portion adapted to mechanically fit into the chip card reader of the vending machine and having electric contacts to make electrical connections with electrical contacts of said chip card reader in order to access data stored in said chip card reader, (b) a second portion extending outward from and remaining outside of said reader when said first portion is in said reader, having an opening therein with electric contacts to receive and mechanically support and make electric connection with electric contacts of a PCMCIA card, (c) a program installed in said data collection device to interrogate and retrieve the data stored in said reader when said first position is inserted in said reader, and transfer said retrieved data to said electric contacts of said second portion, whereby said data is transferred to a PCMCIA card connected in said second portion, and (d) said first and second portions being rigidly joined to one another forming a unitary assembly and said second portion securely mechanically holding said PCMCIA card in said second portion with said second portion's electric contacts in contact with said PCMCIA electric contacts, and said second portion being a handle for gripping said device.

2. The device of claim 1, further comprising in said second portion a PCMCIA card having communications link for transferring data received from said chip card reader.

3. The device of claim 2, wherein said communications link comprises a wireless modem.

4. The device of claim 1, further comprising a PCMCIA card selected from the group consisting of memory, modem, and wireless modem.

5. The device of claim 1 further comprising a clock for appending to the retrieved data, the date and time said data is retrieved.

6. The device of claim 1, wherein said off line vending machine is selected from the group consisting of parking meters, check-out counter cash register, and access control to a secured area.

7. A card adaptor device to be connected between an off-line smart card read/write terminal with a slot for a smart card and a PCMCIA card comprising (a) a first portion with predetermined mechanical dimensions to fit into the smart card reader/writer slot, and electric contacts to mate with electric contacts in the smart card reader/writer slot, (b) a second portion away from said first portion and extending outside said reader/writer slot when said first portion is in said slot and having a mechanical support for a PCMCIA card, and connections to mate mechanically and electrically with the PCMCIA card, (c) a microcontroller connectable to said first part electric contacts and providing to said contacts commands to transfer data between said data read/write terminal and said PCMCIA card when said device is connected to both said read/write terminal and said PCMCIA card.

8. The device of claim 7, further comprising a PCMCIA card connectable to said second portion wherein said PCMCIA card is selected from the group consisting of memory, modem, and wireless communications.

9. The device according to claim 7, wherein said second portion surrounds the PCMCIA card when said PCMCIA card is therein, and is a unitary assembly with said first portion, and also provides a handle for the device for gripping by an operator.

10. The device of claim 7, further comprising a PCMCIA card connectable to said second portion wherein said PCM- CIA card is a wireless communications modem, and said microcontroller establishes the connection to the read/write terminal, with an authentication between the device and the read/write terminal being established by a remote computer telecommunicationally connected to the read/write terminal by the PCMCIA modem and said device.

11. The device of claim 7, wherein said transfer of data comprising downloading new software and/or data to the read/write terminal.

12. The device of claim 7, wherein said connection between said second portion and said PCMCIA card comprises a 68-pin parallel bus providing data, control signals, and power thereon.

13. The device of claim 7, wherein said microcontroller comprises authentication programs for identifying said device and by which said device becomes entitled to and thus gains access to otherwise restricted functions in said read/write terminal.

14. The device of claim 13, wherein said restricted functions comprise access to restricted data and commands to alter data in said read/write terminal.

15. The device of claim 7, wherein said second portion surrounds said PCMCIA card when said PCMCIA card is in said second portion, said first and second portions being a unitary assembly and said second portion providing a handle for the device to be gripped by an operator, and for the operator to insert the first portion into the terminal.

16. A method of transferring data between an off-line smart card reader/writer terminal which vends goods/services and a remotely located central computer which receives data of the goods/services comprising the steps of:

(a) inserting a smart card adaptor into the off-line smart card reader/writer terminal which vends goods/ services, (b) establishing communication between the reader/writer terminal and the smart card adaptor inserted therein, (c) transferring programs/data between the reader/writer terminal and a PCMCIA card connected to the smart card adaptor, said transfer including data of the goods/ services sold from said terminal and (d) transferring said programs/data between the PCMCIA card and the remote central computer.

17. The method of claim 16, wherein the PCMCIA card is a wireless communications modem and the transfer from the PCMCIA card to the central computer is effected while the smart card is in communication with the read/write terminal.

18. The method of claim 17, wherein the establishing communication step after the card is inserted, further comprises an exchange of data between the central computer and the read/write terminal for establishing an authentication communication between the off line read/write terminal and said remote central computer, said authentication being made prior to the transferring of program/data between the read/write terminal and the PCMCIA card.

19. The method of claim 16, wherein said off-line smart card terminal is selected from the group consisting of parking meters and vending machines.

* * * * *